United States Patent [19]

Black

[11] 3,877,714

[45] Apr. 15, 1975

[54] TRAILER ATTACHMENT FOR PICK-UP TRUCK

[76] Inventor: John O. Black, 18094 Parkside, Detroit, Mich. 48221

[22] Filed: Jan. 25, 1974

[21] Appl. No.: 436,505

[52] U.S. Cl. .................. 280/34 R; 280/78; 296/51
[51] Int. Cl. ........................................... B62d 21/14
[58] Field of Search ........ 280/78, 34 R; 296/51, 61, 296/26

[56] References Cited
UNITED STATES PATENTS

| | | | |
|---|---|---|---|
| 2,254,437 | 9/1941 | Marney | 296/26 |
| 2,706,055 | 4/1955 | Nichols | 296/26 |
| 3,436,096 | 4/1969 | Rogge | 280/34 R |

Primary Examiner—Robert R. Song
Attorney, Agent, or Firm—Harness, Dickey & Pierce

[57] ABSTRACT

The cargo box of a pickup truck is short in length and when poles, boards, pipe and other elements of substantial length are to be hauled thereby the present trailer may be attached to the end of the truck to provide an extension thereto which supports the extending ends of the elements. A pair of eye bolts are secured to the floor of the box adjacent to each side and the tailgate and the trailer has a platform with apertures alignable with the apertures of the eye bolts which are attached thereto by removable pivots. The rear end of the platform has a castered wheel secured thereto to support its outer end and provide maneuverability thereto. The platform is fixed relative to the cargo box floor and to the extending portions of the elements which rest thereon.

5 Claims, 3 Drawing Figures

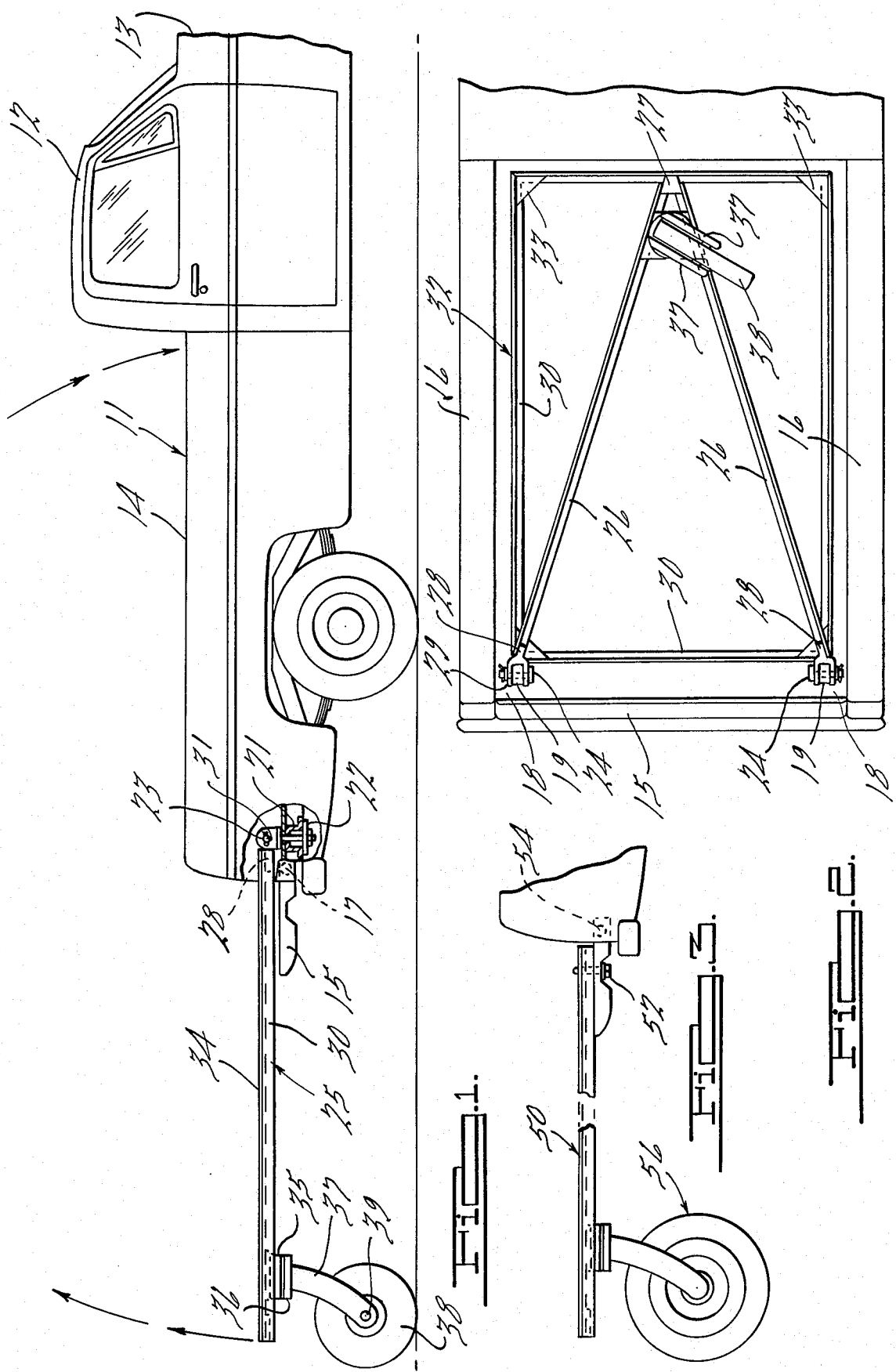

3,877,714

TRAILER ATTACHMENT FOR PICK-UP TRUCK

BACKGROUND OF THE INVENTION

Reference may be had to U.S. Pat. Nos. 2,686,060; 3,642,156 and 3,570,690 for disclosures showing an extending portion for the rear of a truck which is employed for loading or hauling materials.

SUMMARY OF THE INVENTION

The invention pertains to a trailer in the nature of a platform which has a V-shaped central supporting member with the spaced ends provided with an aperture and the abutted ends provided with a castered wheel. The V-shaped element supports a rectangular frame made up of angle members and gusset plates which support a platform of wood or metal, preferably a light metal such as aluminum. A pair of eye bolts are provided for attachment to the floor of the cargo box of the truck adjacent to the tailgate and the truck sides to which the ends of the V-shaped member are pivotedly connected by removable pivots. When the tailgate of the truck is lowered, the platform may be pivotedly secured to the eye bolts in extension of the floor of the cargo box or slightly thereabove. If the long elements to be carried by the trailer are to be maintained in horizontal position, cross pieces may be placed on the box floor with the top surfaces disposed in the plane of the top of the platform. The caster wheel permits the driving of the truck around corners without any strain upon the trailer or movement of the supporting elements relative thereto. After use, the pivot pins may be released and the platform disconnected from the eye bolts or the platform may be swung upwardly through 180° to rest upon the floor of the cargo box when the platform has a proper length and width.

BRIEF DESCRIPTION OF THE DRAWING

FIG. 1 is a view of elevation in a pickup truck with parts broken away and with the trailer of the present invention secured thereto;

FIG. 2 is a view of the structure illustrated in FIG. 1, with the trailer pivoted through 180° to rest upon the floor of the cargo box of the truck, and FIG. 3 is a view, similar to FIG. 1 of another embodiment of the invention.

DESCRIPTION OF THE PREFERRED EMBODIMENT

A truck 11 of the conventional pickup type has a cab 12, a forward engine compartment 13 and a cargo box 14 in the rear of the cab. The cargo box has a tailgate 15 disposed between the sides 16 of the box and secured on pivots 17 which permit the tailgate to be moved from a vertical position closing the end of the box, as illustrated in FIG. 2, to an extended position, as illustrated in FIG. 1. On the floor of the box adjacent to the rear corners 18 eye bolts 19 are secured to a cross member 21 by plates and nuts 22. The eye bolt has an aperture 23 supporting a removable pivot pin 24. A trailer 25 has a pair of angle members 26 disposed in V-relationship and secured at the front abutted ends by a plate 27. The rear ends of the angle members are secured to end members 28 which have biforcated ends 29 containing aligned apertures 31. The biforcated ends 29 extend over the heads of the eye bolts 19 and the pins 24 releasably and pivotedly secure the V-shaped elements 26 to the eye bolts in extension of the truck box floor. The members 26 support a rectangular frame 32 which is made up of angle members 30 which are secured together by gusset plates 33 at the corners and to the V-shaped elements 26 at the ends thereof. The frame 32 has a platform 34 secured thereto which is made of metal, although wood or other material could be employed. The platform and supporting elements are made as light as possible so that when the platform is of a proper dimension in length and width, it will fit within the cargo box when swung through 180° to rest therein as illustrated in FIG. 2. This novel arrangement permits the platform to be carried within the box when the truck is used for hauling other elements or when returning after delivering a load of members which are of substantial length. The rear end of the trailer 25 has a socket 35 for the rotatable end 36 of arcuate caster arms 37 which support a wheel 38 on a bearinged shaft 39. Since the extending end of the trailer 25 will swing laterally to one side or the other as the truck is driven down a road or around a corner, the caster wheel permits the swinging of the extending end without any undue strain on the trailer. The wheel, as illustrated in FIG. 2, extends upwardly within the cargo box when the trailer is swung upwardly thereinto. The trailer is spaced from the tailgate out of contact therewith and while the top of the platform is above the top of the cargo box floor, cross members may be placed thereon of such thickness as to have the top surface aligned with the top surface of the platform 34. The present trailer may be used on any type of pickup truck having a single or double wall tailgate since the tailgate is constructed to be disposed in the plane of the floor or slightly therebelow when in open position to be out of engagement with the trailer.

Referring to FIG. 3, a trailer 50 is secured directly to the tailgate 15 of the truck 11 as by bolts 52. Thus, the tailgate hinge 54 functions to transmit tractive effort to the trailer 50, as well as to enable the trailer 50 to be swung upwardly to a vertical position when not in use. Another feature of the embodiment of FIG. 3 is that the trailer 50 utilizes the spare tire 56 of the truck 11.

I claim:

1. A truck and trailer combination comprising a truck having an elongated rectangular cargo deck, an elongated rectangular frame, pivot means at the rear portion of said truck cargo deck for releasably and pivotally connecting said frame to said deck for rotation about a horizontal pivot means located transversely of said truck and for transmitting tractive effort between said truck and said trailer, and a castered wheel disposed on the longitudinal centerline of said frame and spaced from said horizontal pivot means so as to be engagable with the ground when said frame extends rearwardly of said truck, the length and width of said frame being such as to be snugly received within the perimeter of said cargo deck when said frame is rotated upwardly and forwardly through approximately 180° so as to overlay said cargo deck.

2. A trailer attachment as recited in claim 1, wherein said rectangular frame has a central section of V-formation.

3. A trailer attachment as recited in claim 2, wherein said central section of V-formation forms the support for said a rectangular frame.

4. A trailer attachment as recited in claim 3, wherein the apex of the V-frame fixedly supports a journal extending at a right angle to the plane of said frame for receiving the rotatable end of the castered wheel.

5. A truck and trailer combination comprising a truck having an elongated cargo deck enclosed by sides and a pivoted tailgate, an elongated frame, means releasably connecting said frame to said deck for rotation about a horizontal axis to a horizontal position above said tailgate for transmitting tractive effort between said truck and said trailer and for supporting said frame within the deck area when the tailgate is in raised position, and a castered wheel spaced from said horizontal axis and rotatable in a vertical socket fixed to said frame with the wheel in position to engage the ground when said frame extends rearwardly of said truck.

* * * * *